United States Patent [19]
Fujii et al.

[11] Patent Number: 5,308,904
[45] Date of Patent: May 3, 1994

[54] RESIN COMPOSITION, POROUS FILM OR SHEET

[75] Inventors: Toshio Fujii; Akihiko Sakai; Tasuku Suzuki, all of Kurashiki, Japan

[73] Assignee: Mitsubishi Kasei Corporation, Tokyo, Japan

[21] Appl. No.: 910,899

[22] Filed: Jul. 10, 1992

[30] Foreign Application Priority Data

Jul. 23, 1991 [JP] Japan ................. 3-182677

[51] Int. Cl.$^5$ .......................... C08K 5/10; C08K 5/20
[52] U.S. Cl. ..................... 524/232; 524/233; 524/287; 524/427; 524/433
[58] Field of Search ............... 524/232, 233, 287, 427, 524/433; 525/387

[56] References Cited

U.S. PATENT DOCUMENTS

| | | | |
|---|---|---|---|
| 3,308,068 | 3/1967 | Wartman | 524/287 |
| 4,529,764 | 7/1985 | McKinney et al. | 524/232 |
| 4,705,812 | 11/1987 | Ito et al. | 521/134 |
| 5,015,521 | 5/1991 | Fujii et al. | 521/134 |

FOREIGN PATENT DOCUMENTS

| | | | |
|---|---|---|---|
| 62-33252 | 7/1987 | Japan . | |
| 3069851 | 3/1988 | Japan | 524/287 |

*Primary Examiner*—Kriellion S. Morgan
*Attorney, Agent, or Firm*—Nixon & Vanderhye

[57] ABSTRACT

Disclosed herein are a resin composition for a porous film or sheet, comprising:

100 parts by weight of a polyolefin (A) having a density of not more than 0.930 g/cm$^3$ and a melt index of not more than 2 g/10 min;

100 to 400 parts by weight of a filler (B);

1 to 100 parts by weight of a plasticizer (C) composed of a compound having an ester linkage or an amide linkage in a molecule, and having a molecular weight of not less than 100, a boiling point of not lower than 200° C. and a melting point of not higher than 100° C. under an ordinary pressure; and 0.0001 to 0.1 part by weight of a radical generator (D);

a porous film or sheet therefrom; and
a process for producing the same.

14 Claims, No Drawings

RESIN COMPOSITION, POROUS FILM OR SHEET

BACKGROUND OF THE INVENTION

The present invention relates to a resin composition for a porous film or sheet, a porous film or sheet, and a method of producing the same.

Porous synthetic resin films having minute pores which do not pass water drops therethrough but allow gas such as vapor to pass therethrough, have recently been come to use in the clothing field, the medical field, etc. Such films have a function of preventing from becoming stuffy and passing through no liquid. They are used for throwaway diapers, raincoats, throwaway sheets, etc.

One of the typical methods of producing such a porous film having air permeability (breathability) is a method comprising the steps of mixing an inorganic filler such as calcium carbonate, talc and clay with a synthetic resin, forming a film therefrom and stretching the thus-obtained film to form fine cracks on the film.

A porous film or sheet obtained in the said method has a problem in which physical properties such as anisotropy, the balance between tensile strengths in the machine direction and in the transverse direction, and the surface strength are inferior.

To solve these problems, a method of producing a porous film or sheet comprising extruding a composition containing a specific amount of linear polyethylene, branched low-density polyethylene, radical generator and filler, and stretching the obtained film or sheet (U.S. Pat. No. 5,015,521).

However, a porous film or sheet which has a more excellent tear strength in addition to a good balance between tensile strengths in the machine direction and in the transverse direction and an excellent surface strength, and in which the unevenness of stretching and the nonuniformity in film thickness are ameliorated, is further demanded.

As a result of various studies undertaken by the present inventors in order to meet such demand, it has been found that by forming a film or sheet by an inflation method from a composition containing as a plasticizer a compound having an ester linkage or an amide linkage in a molecule and having a molecular weight of not less than 100, a boiling point of not lower than 200° C. and a melting point of not higher than 100° C. under an ordinary pressure, and a radical generator, and uniaxially stretching the resultant film or sheet in the machine direction, the obtained porous film or sheet has more excellent tear strength and surface strength, and scarcely suffers from the unevenness of stretching and the nonuniformity in film thickness. The present invention has been achieved on the basis of this finding.

SUMMARY OF THE INVENTION

In a first aspect of the present invention, there is provided a resin composition for a porous film or sheet, comprising:

100 parts by weight of a polyolefin (A) having a density of not more than 0.930 g/cm$^3$ and a melt index of not more than 2 g/10 min;

100 to 400 parts by weight of a filler (B);

1 to 100 parts by weight of a plasticizer (C) composed of a compound having an ester linkage or an amide linkage in a molecule, and having a molecular weight of not less than 100, a boiling point of not lower than 200° C. and a melting point of not higher than 100° C. under an ordinary pressure; and 0.0001 to 0.1 part by weight of a radical generator (D)

In a second aspect of the present invention, there is provided a porous film or sheet produced by forming a film or sheet by an inflation method from the composition defined in a first aspect of the present invention and uniaxially stretching the resultant film or sheet in the machine direction.

In a third aspect of the present invention, there is provided a method of producing a porous film or sheet comprising the steps of: forming a film or sheet from a composition defined in the first aspect by means of an inflation method in a blow-up ratio of 2 to 8 after or treating with conditions for decomposing the radical generator; and uniaxially stretching the resultant film or sheet obtained in the machine direction in a stretch ratio of 1.2 to 8.

DETAILED DESCRIPTION OF THE INVENTION

As the polyolefin (A), a polyolefins thermoplastic resin of a homopolymer of ethylene or propylene, or a copolymer of ethylene or propylene and another comonomer (compound having at least one double bond with not less than 4 carbon atoms in a molecule), having a density ($\rho$) of not more than 0.930 g/cm$^3$ and a melt index (MI) of not more than 2 g/10 min is usable. As concrete example of the polyolefin (A), low-density polyethylene, linear low-density polyethylene, ethylene-vinyl acetate copolymer, very low-density polyethylene having a density of not more than 0.910, polypropylene, ethylene-propylene copolymer, ethylene-propylene-diene copolymer, ethylene-methacrylic ester and a mixture thereof may be exemplified. Among these, a polyolefins thermoplastic resin composed of 50 to 100 parts by weight of a linear low-density polyethylene having a density of 0.91 to 0.95 g/cm$^3$ and 0 to 50 part by weight of an ethylene-$\alpha$-olefin copolymer having a density of less than 0.91 g/cm$^3$, and having a density of not more than 0.930 g/cm$^3$, more preferably 0.900 to 0.925 g/cm$^2$ and a melt index of not more than 2, more preferably 0.1 to 1.5, is preferred.

As the low-density polyethylene, a copolymer of ethylene and another $\alpha$-olefin, produced, for example, by copolymerizing ethylene and about 4 to about 17 wt %, preferably 5 to 15 wt % of another $\alpha$-olefin such as 1-butene, 1-hexene, 1-octene, 1-decene and 4-methyl-1-pentene in the presence of a Ziegler catalyst or a Phillips catalyst may be exemplified.

As the ethylene-$\alpha$-olefin copolymer, a copolymer of ethylene and an $\alpha$-olefin having not less than 3 carbon atoms and having a density of less than 0.91 g/cm$^3$, more preferably 0.85 to 0.90 g/cm$^3$ may be exemplified. As the $\alpha$-olefin having not less than 3 carbon atoms which is copolymerized with ethylene, propylene, 1-butene, 1-pentene, 1-hexene, 4-methyl-1-pentene, etc. may be exemplified. Further, a non-conjugated diene such as 1,4-hexadiene, dicyclopentadiene and ethylidenenorbornene is usable with the $\alpha$-olefin.

The ethylene-$\alpha$-olefin copolymer is produced by copolymerizing ethylene and an $\alpha$-olefin in the presence of a Ziegler catalyst, especially, a catalyst composed of a vanadium compound such as vanadium oxytrichloride and vanadium tetrachloride and an organic aluminum compound. An ethylene-$\alpha$-olefin copolymer containing 40 to 90 mol % of ethylene and 10 to 60 mol % of an α-olefin is preferable. Such an ethylene-α-olefin copolymer is commercially available as, for example, NORSOFLEX (FW1600, FW1900, MW1920, SMW2440, LW2220, LW2500, LW2550) produced by CDF Chimie E.P. Corp.; FLEXDINE (DFDA1137, DFDA1138, DEFD1210, DEFD9042) produced by Nippon Unicar Co., Ltd.; TAFMER (A4085, A4090, P0180, P0480) produced by Mitsui Petrochemical Industries, Ltd.; and JSR-EP (EP02P, EP07P, EP57P) produced by Japan Synthetic Rubber Co., Ltd.

If the density (ρ) of the polyolefin (A) as a polymer or a mixture thereof exceeds 0.930 g/cm$^3$, the synergistic effect of a plasticizer and a radical generator is so small that the tear strength thereof is difficult to enhance.

If the melt index (MI) thereof is more than 2 g/10 min, the tear strength of the film and the film-forming stability may be lowered.

The melt index (MI) in the present invention is a value measured in accordance with the Condition 4 in Table 1 of JIS K 7210, which is a reference standard of JIS K 6760.

It is possible to add heat stabilizer, ultraviolet stabilizer, pigment, antistatic agent, fluorescent agent or the like to the polyolefin (A) by ordinary method.

As the filler (B), inorganic and organic fillers are usable. As the inorganic filler are calcium carbonate, talc, clay, kaolin, silica, diatomaceous earth, magnesium carbonate, barium carbonate, magnesium sulfate, barium sulfate, calcium sulfate, aluminum hydroxide, magnesium hydroxide, zinc oxide, calcium oxide, magnesium oxide, titanium oxide, alumina, mica, asbestos powder, glass powder, Silastic balloon, zeolite and clay silicate may be exemplified. Among these, calcium carbonate, talc, clay, silica, diatomaceous earth and barium sulfate are preferable.

As the organic filler, celluloses powder such as woodflour and pulp powder is used. These powders are used either singly or in the form of a mixture.

The average particle diameter of the filler (B) is preferably 0.5 to 30 μm, more preferably 0.5 to 10 μm, most preferably 0.7 to 5 μm.

If the particle diameter is too large, the denseness of pores in the stretched film or sheet becomes deteriorate, while if the particle diameter is too small, the dispersibility of the filler in the resin and the film-forming property of the composition become to deteriorate.

The filler (B) is preferably subjected to surface treatment from the view point of the dispersibility in the resin and the stretching property of the film or sheet. It is preferable that the surface of the filler (B) is treated with a fatty acid or a metal salt thereof.

As the plasticizer (C), a compound having an ester linkage or an amide linkage in a molecule, and having a molecular weight of not less than 100, preferably not less than 150, more preferably 200 to 1000, a boiling point of not lower than 200° C., preferably not lower than 250° C., more preferably 250° to 700° C. and a melting point of not higher than 100° C., preferably not higher than 50° C., more preferably −100° to 10° C. under an ordinary pressure is usable.

As the plasticizer (C), for example, an ester of a carboxylic acid having not less than 6 carbon atoms and an alcohol having not less than 5 carbon atoms, or an aliphatic amide having 10 to 25 carbon atoms may be used.

Especially, an ester of an aromatic dicarboxylic acid and ah aliphatic alcohol having not less than 6 carbon atoms is preferable. More preferably, an ester of an aromatic dicarboxylic acid or an aromatic tricarboxylic acid and an aliphatic alcohol having 6 to 18 carbon atoms is used. An ester of an aromatic dicarboxylic acid and an aliphatic alcohol having carbon atoms of 8 to 15 or an ester of an aromatic tricarboxylic acid and an aliphatic alcohol having carbon atoms of 6 to 10 is the most preferable.

As the concrete example of these compounds, amide stearate, amide oleate, triisodecyl trimellitate, trioctyl trimellitate, diisodecyl phthalate and dioctyl phthalate may be exemplified. Among these, trioctyl trimellitate and diisodecyl phthalate are the most preferable.

If the melting point of the plasticizer (C) is higher than 100° C., the enhancing effect of the tear strength by the modification of the radical generator tends to become small. If the boiling point is lower than 200° C., the film-forming property and the stretching property thereof tend to deteriorate due to the fuming and foaming during the film-forming process.

If the molecular weight of the plasticizer (C) is too small, the plasticizer (C) unfavorably bleeds from the film.

As the radical generator (D), a compound having a decomposition temperature at which the half-life period thereof is 1 min, of 130° to 300° C., preferably 160° to 260° C. may be exemplified. Such a radical generator (D) is a peroxide such as dicumyl peroxide, 2,5-dimethyl-2,5-di(t-butylperoxy)hexane, 2,5-dimethyl-2,5-bis(t-butylperoxy)-3-hexine, α-α'-bis(t-butylperoxyisopropyl)benzene, dibenzoyl peroxide, and di-t-butyl peroxide-2,5-dimethylhexane-2,5-dihydroperoxide. Among these, 2,5-dimethyl-2,5-bis(t-butylperoxy)-3-hexine is particularly preferable.

A composition according to the present invention comprises 100 parts by weight of the polyolefin resin (A), 100 to 400 parts by weight, preferably 120 to 300 parts by weight, more preferably 130 to 250 parts by weight of the filler (B), 1 to 100 parts by weight, preferably 2 to 50 parts by weight, more preferably 2 to 30 parts by weight of the plasticizer (C), and 0.0001 to 0.1 part by weight, preferably 0.0005 to 0.07 part by weight, more preferably 0.005 to 0.05 part by weight of the radical generator (D).

If the content of the filler (B) is small, the stretched film tends to have insufficient pores and, hence, the porosity of the stretched film tends to become low. On the other hand, if the content of the filler (B) exceeds 400 parts by weight, the kneading property, the dispersibility and the film-forming property tend to deteriorate, and the surface strength of the stretched film or sheet tends to become lower.

If the plasticizer (C) is less than 1 part by weight, the enhancing effect of the tear strength thereof is insufficient. On the other hand, if the plasticizer (C) is more than 100 parts by weight, the kneading property and the dispersibility deteriorate thereof, and in some cases, the film-forming property thereof deteriorates and the stretching property thereof cannot be secured.

If the radical generator (D) is less than 0.0001 part by weight, the synergistic effect of the plasticizer (C) and the radical generator (D) is so small that the tear strength is difficult to enhance. On the other hand, if the radical generator (D) exceeds 0.1 part by weight, the melt index becomes so low that the film is easily broken during the film-forming process and the film produced sometimes has a rough surface.

In the present invention, the polyolefin resin (A), the filler (B), the plasticizer (C) and the radical generator (D) are generally mixed in the above-described ratio by the following method I or II, the resultant mixture is kneaded, pelletized and formed into an unstretched film by an inflation method.

Method I: The polyolefin, the filler, the plasticizer and the radical generator are mixed, kneaded by a kneading machine such as an extruder and a Banbury mixer, pelletized, and formed into a film by an inflation method.

Method II: A master batch is produced in advance by mixing a large amount [e.g., about 0.3 to 2 wt % (3000 to 20000 ppm)] of the radical generator to the polyolefin and melting and kneading the resultant mixture at a temperature in which the radical generator is scarcely reacted with the polyolefin, and at a temperature not lower than the melting point of the polyolefin to form pellets. The obtained master batch is mixed to the polyolefin, the filler and the plasticizer, kneaded, pelletized and formed into a film by an inflation method.

If the polyolefin and the radical generator are kneaded under heating (preferably at a temperature not lower than the temperature at which the half-life period of the radical generator is 10 min) in accordance with the method I or II, a crosslinking reaction is caused by the radical generator, thereby obtaining a modified polymer in which the high-molecular weight components are increased by the intermolecular coupling of the polyolefin and the melt index is lowered. The modified polymer is easily oriented in the transverse direction during the inflation process in comparison with the polymer before modification. When such a modified polymer is stretched, the tensile strength and the impact strength are greatly enhanced.

In order to mix the polyolefin, the plasticizer, the radical generator and the filler, mixing drum, tumbling mixer, ribbon blender, Henschel mixer, super mixer or the like may be used. Among these a high-speed stirring mixer such as a Henschel mixer is preferable. Polyethylene is preferably supplied in the form of a powder which passes through a filter of 10 to 150 mesh, preferably 20 to 60 mesh. The thus-obtained mixture is kneaded by a kneading machine such as screw extruder, biaxial screw extruder, mixing roll, Banbury mixer and biaxial kneading machine.

In the present invention, an unstretched film of about 10 to 200 μm in thickness or an unstretched sheet of about 200 to 400 μm in thickness is generally formed from the mixture obtained in the above-described manner by an inflation method, and the unstretched film or sheet is then stretched.

In the inflation process, the blow-up ratio (BUR) is generally 2 to 8, preferably 3 to 6, and the frost line height is 2 to 50 times, preferably 5 to 20 times of the diameter of the annular slit of the die. If the blow-up ratio is less than 2, the tensile strength and the impact strength of the film tend to deteriorate, while if the blow-up ratio exceeds 8, the bubble stability tends to be lowered. If the frost line height is lower than the above-described range, the tensile strength of the film is sometimes lowered, while if it is higher than the above-described range, the bubble stability tends to be lowered.

The unstretched film or sheet formed by the inflation method is then uniaxially stretched in the machine direction (in the direction of drawing the film). For the uniaxially stretching process, a roll stretching process is generally adopted, but a tubular stretching process with stress laid in the machine direction, in other words, biaxial stretching with stress laid in the machine direction may be adopted. The stretching operation may be carried out either at one stage or at multiple stages.

The stretching operation is preferably carried out at a temperature of (Tm $-100°$ C.) to (Tm $-50°$ C.), more preferably (Tm $-90°$ C.) to (Tm $-50°$ C.) [wherein Tm represents a melting point of the resin composition]. If the film is stretched at a temperature lower than the above-mentioned temperature range, the film tends to suffer from an unevenness of stretching. On the other hand, if the stretching temperature is higher than the above-mentioned range, the porosity of the film tends to be lowered.

The stretching ratio is preferably 1.2 to 8, more preferably 1.5 to 4. The uniaxially stretched film is heat-treated at a temperature of 50° to 100° C., thereby stabilizing the dimensional accuracy of the film. Surface treatment such as a known corona treatment and flame treatment may be adopted.

The thus-obtained porous film or sheet according to the present invention has a high surface strength and a high tear strength, and is free from unevenness of stretching. Especially, in the case where the film thickness is not more than 100 μm, particularly 15 to 50 μm, the porous film according to the present invention is a film having (i) a bending resistance of not more than 50 mm, preferably 10 to 35 mm both in the machine direction and in the transverse direction, respectively, (ii) a moisture permeability is not less than 1500 g/m²·24 hr, preferably 2500 to 5000 g/m²·24 hr, (iii) a surface strength represented by the following formula (1):

$$\text{surface strength [kg]} \geq 35 \times \text{film thickness [mm]} \quad (1),$$

preferably, the following formula (1'):

$$\text{surface strength [kg]} \geq 50 \times \text{film thickness [mm]} \quad (1'),$$

and (iv) a tear strength represented by the following formula (2):

$$\text{tear strength [g/sheet]} \geq 1500 \times \text{film thickness [mm]} \quad (2),$$

preferably, the following formula (2'):

$$\text{tear strength [g/sheet]} \geq 1800 \times \text{film thickness [mm]} \quad (2').$$

The porous film according to the present invention is excellent in, especially, tear strength and surface strength, and scarcely suffers from unevenness of stretching. It is thus possible to use the porous film for throwaway diapers, raincoats, throwaway sheets, etc. with advantages.

EXAMPLES

The present invention will be explained in more detail hereinunder with reference to the following examples, but it is to be understood that the present invention is not restricted to these examples within the true spirit and scope of the invention.

EXAMPLE 1

(1) 80 parts by weight of a linear low-density polyethylene [melt index (MI): 1.0 g/10 min, density (ρ): 0.921 g/cm³, copolymer component: 1-butene, the content of the copolymer component: 10 wt % and melting point: 120° C.] which was pulverized into a powder which passed through a filter of 40 mesh and 20 parts by weight of an ethylene-propylene copolymer [EPR, EP07P (produced by Japan Synthetic Rubber Co., Ltd.), MI: 0.4 g/10 min, $\rho$: 0.86 g/cm$^3$] which was pulverized into a powder which passed through a filter of 40 mesh were stirred and mixed by a Henschel mixer. The MI of the resultant polymer composition was 0.8 g/10 min, and the density thereof was 0.909 g/cm$^3$. Thereafter, 4 parts by weight of dioctyl phthalate as a plasticizer and 0.02 part by weight of 2,5-dimethyl-2,5-bis(t-butylperoxy)-3-hexine as a radical generator were added to the resultant composition under stirring.

200 parts by weight of calcium carbonate (average particle diameter: 1.2 $\mu$m, treated with a fatty acid) was further added to the mixture and the resultant mixture was stirred.

The obtained mixture was kneaded and pelletized by a twin-kneading machine DSM-65 (Double Screw Mixer, produced by Japan Steel Works Ltd.).

The pellets were formed into a film of about 70 $\mu$m by an inflation method by using an extruder of 40 mm$\phi$ under the following conditions:

Cylinder temperature: 170°-190°-210°-230° C.
Head and die temperature: 200° C.
Diameter of the die: 100 mm
Draw-off speed: 8 m/min
Blow-up ratio: 3
Frost line height: 700 mm
Flattened tube width: 471 mm.

The film obtained in this manner was slit in the machine direction (direction of drawing) and uniaxially stretched by stretching rolls under the following conditions:

Stretching temperature: 60° C.
Stretch ratio: 2.0
Rolls speed before stretching: 5.5 m/min
Rolls speed after stretching: 11.0 m/min
Film thickness after stretching: 30 $\mu$m.

The physical properties of the obtained film were evaluated in the following methods and the results are shown in Table 1.

1) The moisture permeability was evaluated in accordance with ASTM E26-66 (E).

2) The tear strength in the machine direction of the film was measured in accordance with JIS P 8116 and the strength (g) per sheet was obtained.

3) Surface strength:

A film sample was cut into a square of 100 mm × 100 mm, and fixed between two rings having an inner diameter of 80 mm. A rod-like plunger of 20 mm in diameter and having a semicylindrical end portion of 10 mm in radius was pressed against the center of the film at a rate of 500 mm/min. The indentation depth at the point of time when the film was ruptured, was regarded as elongation, and the strength at the rupture point was measured as the surface strength.

4) The film-forming property was visually judged in accordance with the following criteria:

⊚: Bubble was more stabilized and no die line was observed.
◯: Bubble was more stabilized and a die line was observed.
△: Fluctuation in the film width was observed.
×: Film formation was impossible.

5) The softness was evaluated in accordance with the following criteria while feeling a specimen with a hand:
⊚: Very soft.
◯: Soft.
△: Slightly hard.
×: Hard.

6) Stretching property:
⊚: No rupture, even stretching. No unevenness of stretching nor nonuniformity in film thickness.
◯: No rupture, and hardly any unevenness of stretching and nonuniformity in film thickness.
△: No rupture, slight unevenness of stretching and nonuniformity in film thickness.
×: Rupture, or great unevenness of stretching and nonuniformity in film thickness.

EXAMPLE 2

80 parts by weight of the same linear low-density polyethylene as in Example 1 and 20 parts by weight of ethylene-butene rubber [TAFMER A4085 (trade name, produced by Mitsui Petrochemical Industries, Ltd.), MI: 3.6 g/10 min, $\rho$: 0.88 g/cm$^3$] were mixed. The density of the polymer composition obtained was 0.913 g/cm$^3$ and the MI was 1.3 g/10 min. Thereafter, 6 parts by weight of trioctyl trimellitate as a plasticizer, 0.03 part by weight of 2,5-dimethyl-2,5 -bis(t-butylperoxy)-3-hexine as a radical generator and 200 parts by weight of calcium carbonate were added to the resultant composition.

A film (thickness: 30 $\mu$m) was formed under the same conditions as in Example 1 except that the frost line height was changed to 800 mm. The results of the evaluation of the physical properties of the film are shown in Table 1.

EXAMPLE 3

80 parts by weight of the same linear low-density polyethylene as in Example 1 and 20 parts by weight of a very low-density polyethylene [FW1900 (produced by CDF Chimie E.P. Corp.), MI: 1.0 g/10 min, $\rho$: 0.900 g/cm$^3$] were mixed. The density of the polymer composition obtained was 0.917 g/cm$^3$ and the MI was 1.0 g/10 min. Thereafter, 3 parts by weight of diisodecyl phthalate as a plasticizer, 0.02 part by weight of the same radical generator as in Example 1 and 200 parts by weight of calcium carbonate were added to the resultant composition.

A film (thickness: 30 $\mu$m) was formed under the same conditions as in Example 1 except that the frost line height was changed to 1000 mm and the stretching ratio to 2.1. The results of the evaluation of the physical properties of the film are shown in Table 1.

EXAMPLE 4

80 parts by weight of a linear low-density polyethylene [MI: 0.5 g/10 min, density: 0.921 g/cm$^3$, copolymer component: 1-butene, the content of the copolymer component: 10 wt % and melting point: 120° C.] and 20 parts by weight of the same ethylene-butene rubber as in Example 2 was mixed. The density of the polymer composition obtained was 0.909 g/cm$^3$, and the MI was 0.5 g/10 min. Thereafter, 4 parts by weight of diisodecyl phthalate as a plasticizer, 0.03 part by weight of the same radical generator as in Example 1 and 200 parts by weight of calcium carbonate were added to the resultant composition.

A film (thickness: 30 $\mu$m) was formed under the same conditions as in Example 1 except that the frost line height was changed to 800 mm and the stretch ratio to 2.5. The results of the evaluation of the physical properties of the film are shown in Table 1.

EXAMPLE 5

80 parts by weight of the same linear low-density polyethylene as in Example 4 and 20 parts by weight of the same ethylene-butene rubber as in Example 2 were mixed. The density of the polymer composition obtained was 0.913 g/cm$^3$, and the MI was 0.7 g/10 min. Thereafter, 4 parts by weight of amide oleate as a plasticizer, 0.02 part by weight of the same radical generator as in Example 1 and 200 parts by weight of calcium carbonate were added to the resultant composition.

A film (thickness: 30 μm) was formed under the same conditions as in Example 1 except that the stretch ratio was changed to 2.2. The results of the evaluation of the physical properties of the film are shown in Table 1.

EXAMPLE 6

100 parts by weight of the same linear low-density as in Example 1, 4 parts by weight of trioctyl trimellitate as a plasticizer, 0.03 part by weight of the same radical generator as in Example 1 and 200 parts by weight of calcium carbonate were used.

A film (thickness: 30 μm) was formed under the same conditions as in Example 1 except that the frost line height was changed to 600 mm. The results of the evaluation of the physical properties of the film are shown in Table 1.

EXAMPLE 7

A film (thickness: 30 μm) was formed under the same conditions as in Example 1 except that 2,5-dimethyl-2,5-di(t-butyl peroxide) was used as the radical generator. The results of the evaluation of the physical properties of the film are shown in Table 1.

COMPARATIVE EXAMPLE 1

A film (thickness: 30 μm) was formed under the same conditions as in Example 1 except that no plasticizer was used. The results of the evaluation of the physical properties of the film are shown in Table 1.

COMPARATIVE EXAMPLE 2

A film (thickness: 30 μm) was formed under the same conditions as in Example 1 except that no radical generator was used. The results of the evaluation of the physical properties of the film are shown in Table 1.

COMPARATIVE EXAMPLE 3

A film (thickness: 30 μm) was formed under the same conditions as in Example 2 except that no plasticizer was used. The results of the evaluation of the physical properties of the film are shown in Table 1.

COMPARATIVE EXAMPLE 4

A film (thickness: 30 μm) was formed under the same conditions as in Example 2 except that no radical generator was used. The results of the evaluation of the physical properties of the film are shown in Table 1.

COMPARATIVE EXAMPLE 5

A film (thickness: 30 μm) was formed under the same conditions as in Example 2 except that neither plasticizer nor radical generator was used. The results of the evaluation of the physical properties of the film are shown in Table 1.

COMPARATIVE EXAMPLE 6

A film (thickness: 30 μm) was formed under the same conditions as in Example 6 except that 120 parts by weight of the plasticizer was used and the frost line height was changed to 700 mm. The results of the evaluation of the physical properties of the film are shown in Table 1.

COMPARATIVE EXAMPLE 7

A film (thickness: 30 μm) was formed under the same conditions as in Example 1 except that 4 parts by weight of ethylene bis(stearyl)amide (melting point: 145° C.) was used as the plasticizer. The results of the evaluation of the physical properties of the film are shown in Table 1.

COMPARATIVE EXAMPLE 8

A film (thickness: 30 μm) was formed under the same conditions as in Example 1 except that 4 parts by weight of dimethylformamide (boiling point: 153° C.) was used as the plasticizer. The results of the evaluation of the physical properties of the film are shown in Table 1.

COMPARATIVE EXAMPLE 9

A film (thickness: 30 μm) was formed under the same conditions as in Example 2 except that 100 parts by weight of ethylene-butene rubber was used instead of the linear low-density polyethylene, 4 parts by weight of trioctyl trimellitate was used as the plasticizer, 0.03 part by weight of the radical generator was used and the frost line height was changed to 700 mm. The results of the evaluation of the physical properties of the film are shown in Table 1.

TABLE 1

| | Plasticizer (part by weight) | Radical generator (part by weight) | Frost line height (mm) | Moisture permeability (g/m$^2$/24 hr) | Tear strength (g/sheet) | Surface strength (Kg)/elongation (mm) | Film-forming property | Softness | Stretching property |
|---|---|---|---|---|---|---|---|---|---|
| Example 1 | Dioctyl phthalate (4) | 2,5-dimethyl-2,5-bis(t-butylperoxy)-3-hexine (0.02) | 700 | 3800 | 60 | 1.77/48 | ○ | ○ | ○ |
| Example 2 | Trioctyl phthalate (6) | 2,5-dimethyl-2,5-bis(t-butylperoxy)-3-hexine (0.03) | 800 | 3000 | 65 | 1.80/52 | ○ | ○ | ○ |
| Example 3 | Diisodecyl phthalate (3) | 2,5-dimethyl-2,5-bis(t-butylperoxy)-3-hexine (0.02) | 1000 | 3310 | 70 | 1.75/45 | ○ | ○ | ○ |
| Example 4 | Diisodecyl phthalate (4) | 2,5-dimethyl-2,5-bis(t-butylperoxy)-3-hexine (0.03) | 800 | 3451 | 66 | 1.79/47 | ○ | ○ | ○ |
| Example | Amide | 2,5-dimethyl-2,5- | 700 | 3760 | 60 | 1.70/43 | ○ | ○ | ○ |

TABLE 1-continued

| | Plasticizer (part by weight) | Radical generator (part by weight) | Frost line height (mm) | Moisture permeability (g/m$^2$/24 hr) | Tear strength (g/sheet) | Surface strength (Kg)/elongation (mm) | Film-forming property | Soft-ness | Stretching property |
|---|---|---|---|---|---|---|---|---|---|
| | 5 oleate (4) | bis(t-butylperoxy)-3-hexine (0.02) | | | | | | | |
| Example 6 | Trioctyl phthalate (4) | 2,5-dimethyl-2,5-bis(t-butylperoxy)-3-hexine (0.03) | 600 | 3200 | 56 | 1.72/47 | ○ | ○ | ○ |
| Example 7 | Dioctyl phthalate (4) | 2,5-dimethyl-2,5-di(t-butylperoxy)-hexine (0.02) | 800 | 3660 | 59 | 1.76/46 | ○ | ○ | ○ |
| Comp. Example 1 | — | 2,5-dimethyl-2,5-bis(t-butylperoxy)-3-hexine (0.02) | 700 | 3300 | 47 | 1.51/33 | ○ | △ | ○ |
| Comp. Example 2 | Dioctyl phthalate (4) | — | 700 | 3350 | 54 | 1.35/45 | ⊙ | ○ | ○ |
| Comp. Example 3 | — | 2,5-dimethyl-2,5-bis(t-butylperoxy)-3-hexine (0.03) | 800 | 3500 | 50 | 1.55/35 | ○ | △ | ○ |
| Comp. Example 4 | Trioctyl trimellitate (6) | — | 800 | 3600 | 56 | 1.40/47 | ⊙ | ○ | ○ |
| Comp. Example 5 | — | — | 800 | 3100 | 45 | 1.18/31 | ○ | △ | △ |
| Comp. Example 6 | Trioctyl trimellitate (120) | 2,5-dimethyl-2,5-bis(t-butylperoxy)-3-hexine (0.02) | 700 | — | — | — | X | — | — |
| Comp. Example 7 | Ethylene bis(stearyl)-amide (4) | 2,5-dimethyl-2,5-di(t-butylperoxy)-hexine (0.02) | 700 | 3600 | 20 | — | ⊙ | △ | ⊙ |
| Comp. Example 8 | Dimethyl formamide (4) | 2,5-dimethyl-2,5-di(t-butylperoxy)-hexine (0.02) | 700 | — | — | — | X | — | — |
| Comp. Example 9* | Trioctyl trimellitate (4) | 2,5-dimethyl-2,5-di(t-butylperoxy)-hexine (0.03) | 700 | 2260 | 80 | 1.15/53 | △ | ○ | ○ |

(Note) *The polyolefin used is out of the scope of the present invention.

What is claimed is:

1. A resin composition for a porous film or sheet, comprising:
    100 parts by weight of a polyolefin (A) having a density of not more than 0.930 g/cm$^3$ and a melt index of not more than 2 g/10 min;
    100 to 400 parts by weight of a filler (B);
    1 to 100 parts by weight of a plasticizer (C) composed of a compound having an ester linkage or an amide linkage in its number average molecule, and having a molecular weight of not less than 100, a boiling point of not lower than 200° C. and a melting point of not higher than 100° C. under atmospheric pressure; and
    0.0001 to 0.1 part by weight of a radical generator (D).

2. A resin composition according to claim 1, wherein said plasticizer (C) is a compound having an ester linkage or an amide linkage in its number average molecule, and having a molecular weight of 200 to 1000, a boiling point of 250° to 700° C. and a melting point of −100 to 10° C. under atmospheric pressure.

3. A resin composition according to claim 1, wherein said plasticizer (C) is an ester of a carboxylic acid having not less than 6 carbon atoms and an alcohol having not less than 5 carbon atoms or an aliphatic amide having 10 to 25 carbon atoms.

4. A resin composition according to claim 3, wherein said ester is an ester of an aromatic carboxylic acid and an aliphatic alcohol having not less than 6 carbon atoms.

5. A resin composition according to claim 3, wherein said ester is an ester of an aromatic carboxylic acid or an aromatic tricarboxylic acid and an aliphatic alcohol having 6 to 18 carbon atoms.

6. A resin composition according to claim 3, wherein said plasticizer (c) is selected from the group consisting of stearamide, oleamide, triisodecyl trimellitate, trioctyl trimellitate, diisodecyl phthalate and dioctyl phthalate.

7. A resin composition according to claim 1, wherein said radical generator (D) is a compound having a decomposition temperature at which the half-life period thereof is 1 min, of 130° to 300° C.

8. A resin composition according to claim 7, wherein said radical generator (D) is selected from the group consisting of dicumyl peroxide, 2,5-dimethyl-2,5-di(t-butylperoxy)hexane, 2,5-dimethyl-2,5-bis(t-butylperoxy)-3-hexine, α-α'-bis(t-butylperoxyisopropyl)benzene, dibenzoyl peroxide, and di-t-butyl peroxide-2,5-dimethylhexane-2,5-dihydroperoxide.

9. A resin composition according to claim 1, wherein said polyolefin (A) is selected from the group consisting of an ethylene homopolymer, a propylene homopolymer, a copolymer of ethylene or propylene and a compound having at least one double bond with not less than 4 carbon atoms in its molecule, and a mixture thereof.

10. A resin composition according to claim 1, wherein said polyolefin is selected from the group consisting of a low-density polyethylene, a linear low-density polyethylene, an ethylene-vinyl acetate copolymer, a very low-density polyethylene having a density of not more than 0.910, a polypropylene, an ethylene-propylene copolymer, an ethylene-propylene-diene copolymer, an ethylene-methacrylic ester and a mixture thereof.

11. A resin composition according to claim 1, wherein the average particle diameter of said filler (B) is 0.5 to 30 μm.

12. A porous film or sheet produced by forming a film or sheet by an inflation method from said composition defined in claim 1, and uniaxially stretching said film of sheet in the machine direction.

13. A porous film according to claim 12, having a film thickness of not more than 100 μm, a bending resistance both in the machine direction and in the transverse direction of not more than 50 mm, a moisture permeability of not less than 1500 g/m²19 24 hr, a surface strength represented by the following formula (1):

$$\text{surface strength [kg]} \geq 35 \times \text{film thickness [mm]} \qquad (1),$$

and a tear strength represented by the following formula (2):

$$\text{tear strength [g/sheet]} \geq 1500 \times \text{film thickness [mm]} \qquad (2).$$

14. A method of producing a porous film or sheet comprising the steps of: forming a film or sheet from a composition defined in claim, by an inflation method in a blow-up ratio of 2 to 8 after or treating with conditions for decomposing the radical generator; and uniaxially stretching said film or sheet in the machine direction in a stretch ratio of 1.2 to 8.

* * * * *

UNITED STATES PATENT AND TRADEMARK OFFICE
CERTIFICATE OF CORRECTION

PATENT NO. : 5,308,904
DATED : May 3, 1994
INVENTOR(S) : Fujll, et. al.

It is certified that error appears in the above-indentified patent and that said Letters Patent is hereby corrected as shown below:

```
Column 11, Claim 1, line 9, delete "number average--.
                  line 10, before "molecular" insert --number average--.
           Claim 2, line 3, delete "number average".
                   line 4, before "molecular" insert --number average--.
Column 14, Claim 13, line 5, change "g/m²19 24 hr" to --g/m².24 hr--.
           Claim 14, line 3, change "claim" to --claim 1--.
```

Signed and Sealed this

Thirtieth Day of August, 1994

Attest:

BRUCE LEHMAN

*Attesting Officer*          *Commissioner of Patents and Trademarks*